United States Patent Office 3,000,442
Patented Sept. 19, 1961

3,000,442
FRACTURE TREATMENT OF EARTH
FORMATIONS
Marvin Gambill, Hobbs, N. Mex., assignor to United
Chemical Corporation of New Mexico, Hobbs, N. Mex.,
a corporation of New Mexico
No Drawing. Filed June 6, 1957, Ser. No. 663,915
11 Claims. (Cl. 166—42)

This invention relates to a method and composition for applying a fracture treatment to earth formations, particularly oil producing formations.

It is important in oil producing territory to keep oil flowing once the well has been started. Oil wells when the natural gas pressure is diminished, have a tendency to fall off in production, with the result that very often only a fraction of the possible available oil has been recovered. The techniques which have been developed to maintain productivity of the oil formation or to increase the productivity of a partially spent formation, emphasizes by this variety the economic importance of the operation. A most common technique consists of acidizing the well and surrounding earth formations. Very often many thousands of gallons of acid will be pumped into a well. Portions of the formation are actually dissolved and by reducing the resistance of the earth formation itself to the flow of oil, production may be maintained or even at times increased.

It is a fundamental object of this invention to provide an improved method of fracture treatment of earth formations which is particularly useful in certain areas where oil production has dropped to a marginal economic level.

Other objects and advantages of the invention will in part be obvious and in part appear hereinafter.

The novel fracture treatment for earth formations in accordance with this invention, therefore, comprises the operation of pumping granulated salt, preferably at high pressures into the oil formation, the salt being suspended in a fluid medium in which it is substantially insoluble, such for example, as crude oil itself, or a substantially saturated brine, the salt further, as may be desired, serving as a carrier for a composition consisting essentially of alkali metal phosphate-chelating agent-polyglycoside and other protective colloidal materials, such as carboxymethyl cellulose. Corrosion inhibiting agents may be included in the mixture. In accordance with the invention, therefore, the composition for the fracture treatment is made by blending salt, e.g., rock salt, in relatively finely divided condition with a fluid carrier such as oil or substantially saturated brine. A dry composition consisting of salt and the several other ingredients, which may correspond to the composition described in my United States Patent 2,777,818, may also be used in the fluid carrier. The salt or dry blend, or substantially anhydrous mixture, used in the fluid carrier may contain from about 75 percent to 100 percent of the sodium chloride. It is thereafter suspended in the fluid carrier so that the fluid medium may contain as much as 50 percent of the substantially anhydrous solid material. Preferred fluid media for use in accordance with the invention, of course, are those which are most commonly available on the site, namely, crude oil itself, or substantially saturated brine which usually accompanies the production of crude oil from an oil well formation.

The complexing composition useful for addition to the sodium chloride is typically as follows:

200 pounds sodium tripolyphosphate
50 pounds polyamino polycarboxy acid chelating agent (ethylenediaminetetraacetic acid, sodium salt)
40 pounds cactus extract, 10 percent aqueous solution
Water to make about 650 pounds Corrosion inhibitors such as chromates and amines may be used in the composition. Also, carboxymethyl cellulose is a useful protective colloid to add.

The proportions of the ingredients listed may be varied within ranges such that the amount of the polycarboxylic amino acid chelating agent may be equal in weight to that of the tripolyphosphate, or 10 parts of the tripolyphosphate to 1 part of the polyamino polycarboxylic acid. The proportion of cactus juice, or extract which is a typical polyglycoside useful for the purpose, on an anhydrous basis is related to the polyamino carboxylic acid and it may be present in amount about equal thereto in weight, or the polycarboxylic amino acid may be in excess of the cactus juice by an amount of 5 to 1 to 10 to 1. The protective colloid, or the carboxymethyl cellulose, is preferably related to the total of active ingredients and amounts to at least about 1 percent to 5 percent of the other ingredients on a dry weight basis.

The polyphosphates are generally commercially available as such, a common form being the sodium tripolyphosphate which is commonly sold for use in detergent materials.

The polyamino polycarboxylic acid ingredient is an organic chelating agent, typical ones being ethylene-diaminetetraacetic acid, monoethanolethylenediaminetriacetic acid, or diethanolethylenediaminediacetic acid, as their alkali metal salts, or mixtures of these compounds. Other useful chelating agents of the general class are nitrilotriacetic acid, hydroxyethyl imino diacetic acid and dihydroxyethyl glycine, triethanolamine and various combinations thereof. Generally those organic chelating agents which are most effective in approximately neutral or alkaline solution in the complexing of alkaline earth metals are preferred for use in the operation.

The cactus extract is used for its polyglycoside content which is useful in dispersion of scale particles in colloidal form in the solution. It is obtained from the common elephant leaf type cactus of Texas and is commercially available as an extract or dehydrated product which is prepared by dehydrating the cactus and grinding it to a powder. The powder is then extracted with water and the water soluble portion thereof used. The cactus juice or extract has been called "mothobetic alcohol" by some users thereof.

As substitutes for the sodium bichromate corrosion inhibitor, ferro-ferric cyanides and sulfites, or other agents for that purpose may be used.

The mechanism of fracture treatment in accordance with this invention appears to be that when the suspension of the solid material in the fluid is made and pumped under very high pressure into the oil formation, the salt functions as an abrasive and also has a volume filling agent to assist in the distribution of the pressure in the formation. I have found, in general, that pressures of the order of 5,000 pounds per square inch and higher are quite useful in forcing open the earth formations with oil salt fluid mixtures, made in accordance with this invention. The pressures are relatively easily attainable, because in a deep oil well the normal static head of a column of oil filling one of the tubes is a very substantial pressure determined by the depth of the well and positive pressures applied thereto quickly effect extremely high pressures in the bottom of the well in the area of fracture treatment.

More specifically compositions useful for fracture treatment made in accordance with this invention are prepared as follows:

*Example I*

One thousand (1,000) pounds of sodium chloride, rock salt in crude form as available generally, are heated to temperature of the order of 150° C. The purpose of the heating is simply to provide a convenient means of drying added composition; which is a combination consisting essentially of:

100 pounds sodium tripolyphosphate
0 pounds ethylenediaminetetraacetic acid, sodium salt
0 pounds glycoside extract (10 percent aqueous extract of cactus)
Water, to make 650 pounds This composition may be in solution by using more water or as listed, it is merely a wet suspension. It is then sprayed over the hot sodium chloride while the latter is mixed in a blender. Suitable equipment for the purpose is an ordinary cement mixer with a conventional type alligator heater, fired so as to heat it.

Following preparation of the sodium chloride complexing agent blend, the mixture may be ground to a degree of fineness corresponding to about five to ten mesh. A higher degree of fineness is desirable but is economically impracticable. The mixture is then mixed with crude oil in an amount such that the crude oil will carry preferably about 15 to 30 percent of its weight of the solid ingredients. This paste or slurry is then pumped into the well in the amount dictated by the size and depth of the well and ultimate pressure it is desired to obtain in the area of fracture treatment at the bottom of the well.

*Example II*

Following the procedure for Example I it may be noted that ordinary rock salt without the addition of the composition may be ground to the desired degree of fineness suspended in oil and pumped into the well formation.

*Example III*

Following the procedure of Examples I and II, the fluid medium may be substantially saturated brine. Normally, a generous amount of brine is available at an oil well. To the extent it is not saturated, a small additional amount of salt may be used so that about 15–30 percent by weight will be suspended in it.

The amount of rock salt useful for the purpose is preferably 15 to 30 percent but larger amounts may be used. The only interference with the larger quantities is the fact that the mixture may not have sufficient fluidity.

A further variant in the composition useful for pumping into oil formations is prepared by using the sodium chloride complexing agent and mixture of Example I or plain sodium chloride suspended in a substantially saturated aqueous brine as the fluidizing agent.

Since the complexing agent composition used in conjunction with the sodium chloride is effective in aqueous medium in the presence of salt, brine is a useful carrier for the material. The fact that some or all of the complexing composition dissolves in the brine is helpful, because it functions in solution. That is, inasmuch as brine is very often a naturally occurring accompaniment of crude oil, and further, will not dissolve significant additional amounts of sodium chloride, it is a useful medium to use. It is to be understood also that the fluid medium can be a mixture of crude oil and brine in any proportions.

The mechanism of action seems to be a two-fold one, namely, the fluid while being pumped at the extreme high pressure penetrates the formation and, because of the motion of the liquid portion of it, the solid portion exerts an abrasive effect on the fissures of the producing formation, thereby creating new surface for surrendering oil and also it induces a certain amount of actual fracture and breakage of the formation to open up new surfaces.

Where the fluid medium also incorporates the complexing agent mixture, it is to be observed that a certain chemical dissolution and disintegration of the formation also occurs simultaneously so that here again a changed face of formation area becomes available for surrendering oil.

In test wells I have found that fracture treatments applied in accordance with this invention with pure sodium chloride and sodium chloride-complexing agent mixtures are effective substantially to increase the flow of oil from wells which had dropped to unproductive levels. In a given test following the fracture treatment in accordance with this invention, productivity rose from three barrels per day to ten barrels per day. The actual treatment is carried out as follows:

Depending on the depth of the well an appropriate volume of fluid suspension is prepared. The preferred composition is sodium chloride (rock salt) suspended in crude oil as drawn from the well. If the oil contains water or brine in emulsion, no harm is done by using it in that form. The suspension of salt in oil is pumped into the well, pressure is maintained for the necessary time from about 1 to 24 hours to fracture the formation desired, released, and thereafter production is resumed. The beneficial effect of the fracture treatment is noted within about 24 hours after production is resumed, generally in the form of an increased level of production.

Though the invention has been described in terms of a limited number of examples, it is to be understood that variations thereof may be practiced without departing from its spirit or scope.

What is claimed is:

1. A composition useful for fracture treatment of earth formations in which it is suspended in a fluid medium comprising about 3 parts by weight of sodium chloride blended with about 0.1 part to about 3 parts by weight of a composition comprising an alkali metal polyphosphate, a polyamino polycarboxylic acid chelating agent, and a polyglycoside.

2. A composition in accordance with claim 1 in which the alkali metal polyphosphate, polyamino polycarboxylic acid chelating agent, and polyglycoside portions are related to each other in the weight ratio of about 1:1:1 to 10:1:0.1.

3. A composition in accordance with claim 2 in which the polyamino polycarboxylic acid chelating agent is ethylenediaminetetraacetic acid.

4. A composition in accordance with claim 3 in which the polyglycoside is cactus extract.

5. The method of fracture treating earth formations which comprises, injecting into such formations under high pressure sufficient to induce fracture of said formations a fluid composition characterized by its containing about 5 to about 50 parts by weight of solid sodium chloride suspended per 50 parts of fluid, said fluid also carrying in solution a composition consisting essentially of alkali metal polyphosphate, polyamino polycarboxylic acid chelating agent and polyglycoside in the weight ratio of about 1:1:1 to 10:1:0.1, maintaining said pressure for a predetermined interval of time, and, thereafter, releasing said pressure.

6. The method in accordance with claim 5 in which the fluid medium is oil.

7. The method in accordance with claim 5 in which the fluid medium is water.

8. The method of fracture treating earth formations which comprises injecting into such formations under high pressure sufficient to induce fracture of said formations a fluid composition characterized by its containing about 15–30 percent by weight of solid sodium chloride suspended therein, said sodium chloride corresponding at coarsest to about 5 mesh, said fluid also carrying in solution, per hundred parts of fluid, about 0.1 part to about 3 parts by weight of a composition comprising an alkali metal polyphosphate, a polyamino polycarboxylic acid chelating agent, and a polyglycoside maintaining said pressure for a predetermined interval of time and thereafter releasing said pressure.

9. The method in accordance with claim 8 in which the fluid medium is oil.

10. The method in accordance with claim 8 in which the fluid medium is water.

11. The method in accordance with claim 5 in which the fluid medium is saturated aqueous sodium chloride solution.

References Cited in the file of this patent

UNITED STATES PATENTS

| | | |
|---|---|---|
| 2,667,224 | Howard | Jan. 26, 1954 |
| 2,852,077 | Cocks | Sept. 16, 1958 |

OTHER REFERENCES

Martell et al.: Metal Chelate Compounds, Prentice-Hall, 1952, pages 510–511.